United States Patent [19]
Asselbergs

[11] Patent Number: 5,489,238
[45] Date of Patent: Feb. 6, 1996

[54] PORTABLE FAN BOOSTER FOR AIR VENTS

[76] Inventor: Christophe K. J. Asselbergs, 201 7th St., Durant, Iowa 52747

[21] Appl. No.: 307,175

[22] Filed: Sep. 16, 1994

[51] Int. Cl.⁶ .................................................... F24F 7/06
[52] U.S. Cl. ........................................ 454/329; 236/49.3
[58] Field of Search .......................... 236/493; 454/256, 454/258, 289, 306, 329, 338

[56] References Cited

U.S. PATENT DOCUMENTS

| | | | |
|---|---|---|---|
| D. 310,873 | 9/1990 | Asselbergs | D23/370 |
| 1,426,900 | 8/1922 | Neal | 454/338 X |
| 1,843,786 | 2/1932 | Robinson | |
| 1,886,841 | 11/1932 | Searles | |
| 2,661,895 | 12/1953 | Frick | |
| 2,972,941 | 2/1961 | Bennett | 236/49.3 X |
| 3,002,676 | 10/1961 | Papsdorf | |
| 3,035,421 | 5/1962 | Halbeisen | |
| 3,099,201 | 7/1963 | Gottlieb | 454/329 |
| 3,156,233 | 11/1964 | O'Connell | 454/338 X |
| 3,653,589 | 4/1972 | McGrath | 236/49.3 |
| 4,120,615 | 10/1978 | Keem et al. | |
| 4,365,930 | 12/1982 | Ogura et al. | |
| 4,394,957 | 7/1983 | Newton, III | 236/49.3 |
| 4,576,331 | 3/1986 | Harwell | |
| 4,754,697 | 7/1988 | Asselbergs | |
| 4,809,593 | 3/1989 | Asselbergs | |
| 4,846,399 | 7/1989 | Asselbergs | 236/49.4 |
| 5,054,380 | 10/1991 | Hubbard | 454/338 |

FOREIGN PATENT DOCUMENTS 1515197  6/1978  United Kingdom .

Primary Examiner—Harold Joyce
Attorney, Agent, or Firm—Zarley, McKee, Thomte, Voorhees & Sease

[57] ABSTRACT

A fan for increasing the air flow through a register includes a housing having a closed top wall and side walls with air outlet openings therein. A bottom wall has air inlet opening for permitting air to enter from an air register into a fan chamber located within the housing. A centrifugal fan rotor is rotatably mounted in the fan chamber and directs air horizontally outwardly through the side vents in the register.

10 Claims, 2 Drawing Sheets

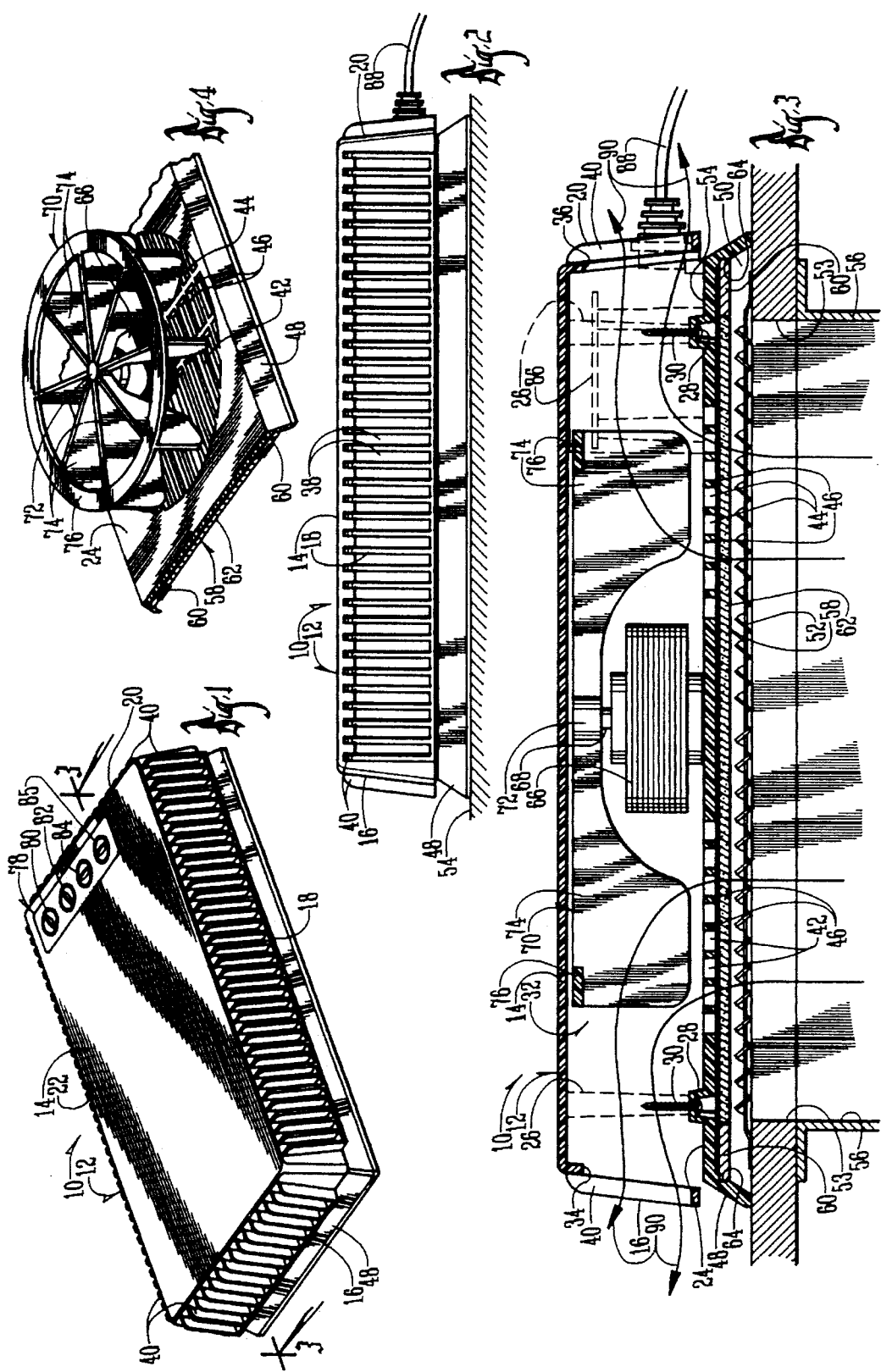

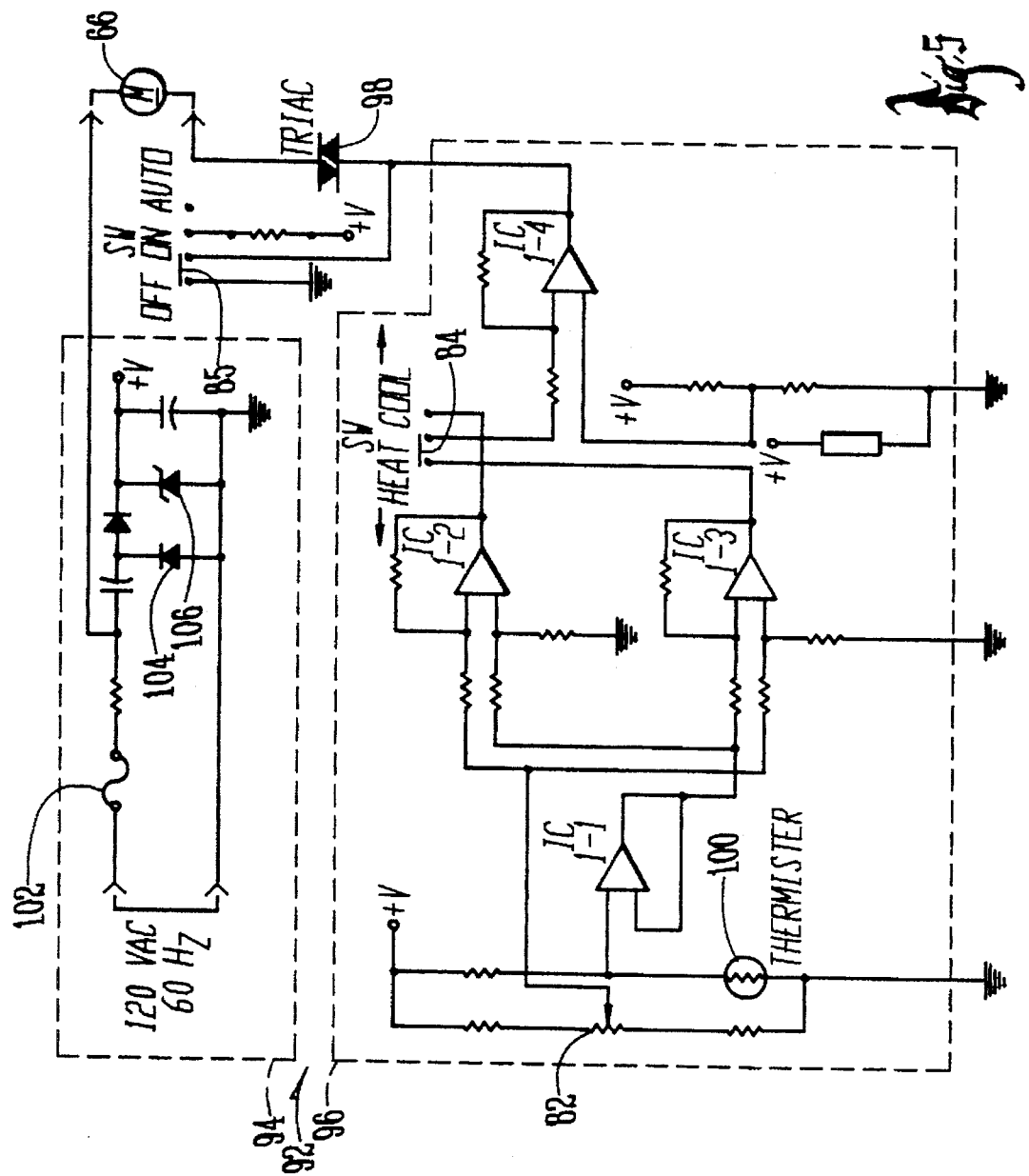

PORTABLE FAN BOOSTER FOR AIR VENTS

BACKGROUND OF THE INVENTION

The present invention relates to a portable fan booster for air vents.

Fan boosters have been used in the past for increasing the efficiency of forced air heating systems. Such fans are placed against a wall or floor register to boost the air flow of the air through the register. Most prior art booster fans use axial flow fans for directing the air through the top of the booster in the same direction as the air exits from the air register.

Therefore a primary object of the present invention is the provision of an improved portable fan booster for air vents.

A further object of the present invention is the provision of a portable fan booster which includes a centrifugal fan capable of directing the air in a radial direction relative to the axis of fan rotation.

A further object of the present invention is the provision of an improved portable fan booster which will operate at lower RPMs than prior art axial flow fans while at the same time achieving the same or greater air flow with much less sound.

A further object of the present invention is the provision of an improved portable fan booster which uses a centrifugal fan capable of inherently building more pressure than previously obtained with axial flow fans.

A further object of the present invention is the provision of an improved portable fan booster which includes an air filter for filtering the air passing there through, the resistance of which would substantially reduce air flow in prior art axial flow fans.

A further object of the present invention is the provision of an improved portable fan booster which substantially increases the air flow over that obtained with previous axial flow air fan boosters.

A further object of the present invention is the provision of a portable fan booster which discharges air in a horizontal plane keeping it low to the floor and minimizing disturbance of curtains or other wall adornments which may be adjacent the air register.

A further object of the present invention is the provision of an improved portable fan booster which has an inherently greater air boosting capacity, thereby making possible the use of a multi speed motor having high-medium-low speeds.

A further object of the present invention is the provision of a portable fan booster which is suitable for boosting high flow volume air conditioner registers commonly used in southern climates.

A further object of the present invention is the provision of an improved thermostat control for the portable fan booster.

A further object of the present invention is the provision of an improved thermostat control which responds quickly to increases and decreases in air temperature.

A further object of the present invention is the provision of a portable fan booster which is economical to manufacture, durable in use, and efficient in operation.

SUMMARY OF THE INVENTION

The foregoing objects may be achieved by a fan for increasing the airflow through a register. The fan includes a housing having a closed top wall, a bottom wall spaced below the top wall, and a side wall interconnecting the top and bottom walls and enclosing a fan chamber therebetween. The bottom wall includes at least one air intake opening therein for permitting air flow from the register into the fan chamber when the bottom wall is placed over the register. The side wall includes at least one air outlet opening permitting air flow from the fan chamber to the exterior of the housing. A centrifugal fan rotor is rotatably mounted in the fan chamber for rotation about a fan axis extending in a line which intersects the bottom wall and the top wall. The fan rotor includes radially extending blades shaped to force air radially outwardly from the fan axis toward the air outlet in the side walls in response to rotation of the fan rotor. A motor is connected to the fan rotor for rotating the fan rotor about the fan axis.

BRIEF DESCRIPTION OF THE DRAWINGS

FIG. 1 is a pictorial view of the portable fan booster of the present invention.

FIG. 2 is a front elevational view thereof.

FIG. 3 is a sectional view taken along line 3—3 of FIG. 1.

FIG. 4 is a pictorial view of the fan rotor and motor assembly which are within the fan chamber of the present invention.

FIG. 5 is a schematic diagram of the control circuitry for the present invention.

DETAILED DESCRIPTION OF THE PREFERRED EMBODIMENT

Referring to the drawings a fan assembly 10 includes a fan housing 12 having a top wall 14, four side walls 16, 18, 20, and 22, and a bottom wall 24. While the housing is shown to be of rectangular configuration it would also be possible to make the housing of other polygonal shapes as well as making the housing rounded or elliptical.

The top wall 14 and the side walls 16, 18, 20, and 22 are attached to the bottom wall 24 by means of support posts 26 held together by screws 30 which extend through screw eyelets 28. The result is an enclosed fan chamber 32. The side walls 16, 18, and 20 are each provided with an air outlet opening 34, 36, 38 respectively. Side wall 22 may also be provided with an outlet opening or may be enclosed if that wall is adapted to be used against an outside wall of a room. The air outlet openings 34, 36, 38 are provided with louvers 40 which help to direct the air passing therethrough in a horizontal direction.

Bottom wall 24 includes two air inlet openings 42, 44 which contain spaced apart louvers 46. While two air inlet openings 42, 44 are shown, the size, number, and shape of the air inlet openings may be changed without detracting from the invention.

Extending downwardly and outwardly from the bottom wall 24 and integrally formed therewith is a parametric skirt flange 48 which is adapted at its lower edges to surround a register 52 and form a register space 50 between the register 52 and the bottom wall 24. Register 52 is fitted within a register opening 53 within a floor 54 and is in communication with a register duct 56 capable of delivering either heated or cooled air through the register 52.

A filter 58 is fitted over the air inlet openings 42, 44 below the bottom wall 24. Filter 58 includes a rectangular filter frame 60 which surrounds a sheet of filter material 62. The filter frame 60 is fitted within a plurality of dimples 64 positioned around the perimeter of skirt flange 48 so as to detachably hold the filter 58 in facing relation over the inlet openings 42, 44 in bottom wall 24.

Centrally located within fan chamber 32 is a fan motor 66 having a rotatably driven motor shaft 68 to which is attached a fan rotor 70. Fan rotor 70 includes a hub 72 attached to shaft 68 and a plurality of radially extending fan blades 74 which are joined at their outer ends and at their upper edges by a circular ring 76. The fan blades 74 lie in a plane which is parallel to the rotational axis of shaft 68 so that the air which they deflect is driven radially away from the axis 68. This is to be contrasted with a typical axial flow fan which includes canted blades capable of driving air axially in a direction parallel to the rotational axis of the fan.

Mounted on the upper surface of top wall 14 is a control console 78 including a fan speed control 80, a thermostat control 82, and a fan mode control 84. The control console 78 is supported by a fan control support 86 within the fan chamber 32. An electric cord 88 is attached to the fan housing 12 and is connected by means not shown to the motor 66 through the control console 78.

Control console includes fan speed switch 80 which can be set for three different fan speeds. Prior art fans of the axial flow type generally operate at a single high speed, and are unable to operate efficiently at lower speeds. The present invention greatly increases the air flow by use of the centrifugal flow fan and by so doing makes possible the use of three different fan speeds at speeds of 1300 RPM, 1150 RPM, and 950 RPM. Prior art axial flow fans were required to operate at nearly 2400 RPM in order to achieve the desired air flow. By reducing the rotational speed of the fan it is possible to make the fan quieter while at the same time moving similar volumes of air achieved with the axial flow fans at 2400 RPM. It has been found that the present fan will move approximately 400 CFM at 1300 RPMs, 300 CFM at 1150 RPMs, and 200 CFM at 950 RPMs.

Control console also includes three other switches 82, 84, and 85 which are incorporated into a control circuitry 92 shown schematically in FIG. 4. The control circuitry includes a power circuit 94 which is adapted to convert 120 volt alternating current to a clean direct current voltage for use by the control circuit 92. The use of the fuse trace 102 and the zenor diodes 104, 106 provides good circuit stability from the power supply circuit 94. The on/off switch 85 has three positions. The first of these positions is the off position shown in FIG. 5. The second position can be used to place the fan in continuous operation and the third position can be used to place the fan in an automatic mode.

In the automatic mode the circuitry of a temperature sensing circuit 96 is employed. Temperature sensing circuit 96 includes the heat/cool switch 84, the thermostat control switch 82, a thermistor 100, a group of four amplifiers IC1-1, IC1-2, IC1-3, and IC1-4. Between the temperature sensing circuit 96 and the motor 66 is a triac switch 98. Triac switch 98 is manufactured by Teccor Company under the product designation L601E5-RP and is capable of being in an open circuit position normally, but is responsive to a predetermined signal for switch to a closed circuit condition to actuate the motor 66.

Thermostat control 82 is a potentiometer rated at 20,000 ohms and manufactured by ACP Company under Part No. CAGWV20K. The thermistor 100 is a low mass thermistor capable of responding quickly to temperature changes of plus or minus two degrees centigrade. The thermistor is rated at 33,000 ohms when at a temperature of 25° C. It is manufactured by Murata Erie Company under part number NTH5D333KA. The four IC amplifiers are manufactured by Motorola Company under the Product No. LM324D.

In operation of the temperature sensing circuit, the on/off switch 85 is placed in its automatic position. The heat/cool switch 84 is placed either in the heat position or the cool position. In the heat position the motor will come on whenever the temperature exceeds a preset temperature and in the cool position the motor will come on whenever the temperature drops below a certain preset temperature.

The preset temperature may be set by utilizing thermostat control 82. For example, if the room temperature is desired to be at 70 degrees and the air conditioner is on, switch 84 is set to the cool position and switch 82 is preferably set to cause the motor to come on approximately six degrees below room temperature. When the air conditioner comes on, the vent passes cool air through the fan, and the thermistor senses the temperature change. The signal from the thermistor 100 and the potentiometer 82 is received at amplifier IC1-1 and is directed to the terminals of IC1-2. The signal from IC1-2 then passes to IC1-4, and IC1-4 delivers the appropriate signal to triac switch 98 so as to cause triac switch 98 to move to its closed position.

When the air conditioner turns off the temperature of the thermistor rises above the preset temperature set by potentiometer 82, and the triac switch 98 is turned off by virtue of the fact that it no longer receives the appropriate signal from the temperature sensing circuit 96.

When the heat/cool switch 84 is placed in the heat position as shown in FIG. 4, the signal passes from IC1-1 to IC1-3 and IC1-4 before passing to triac switch 98. This results in the fan being turned on when the temperature exceeds the preset temperature and results in the fan being turned off when the temperature is below the preset temperature. In the heat mode the switch 82 should be set so that the fan comes on when the temperature reaches approximately six degrees above ambient temperature.

It has been found that because the thermistor 100 reacts quickly to temperature changes, there is a tolerance of plus or minus two degrees above and below the preset temperature at which the fan is actuated or deactuated. This is considerably faster reaction than occurred in prior art devices which used bimetal strips. Often the temperature tolerance was plus or minus twenty degrees with these prior art devices.

When the fan is operating the air is drawn through the register in a direction which is parallel to the rotational axis of fan rotor 70. However, as the air enters the fan chamber 32 it is propelled horizontally in a direction perpendicular to the rotational axis of the fan rotor 70 and outwardly through the air outlet openings 34, 36, 38 in the direction shown by arrows 90.

An important feature of the present invention is the fact that the top wall 14 is completely enclosed so as to prevent air from moving axially with respect to the rotational axis of the fan. Instead the air is directed horizontally out of the fan housing, across the floor of the room being heated or cooled. This minimizes the disturbance of curtains or other wall adornments which may be positioned adjacent the register openings.

The present invention provides several unusual results. It can operate at RPMs which are lower than prior axial flow fans and thus is quieter. The centrifugal fan rotor 70 of the present invention builds more pressure than an axial flow fan and is thus able to include an air filter such as air filter 58. While the air filter 58 is shown to be positioned adjacent the air inlet openings, such a filter could also be provided adjacent the air outlet openings and could be positioned either inside or outside the fan chamber 32 without detracting from the invention. In prior axial flow fan boosters the air pressure has not been sufficient to permit the use of a filter without substantially reducing the air flow to a point where the device is ineffective.

Another advantage obtained with the present invention is that the present air flow booster may be used with high volume air conditioner registers as used in southern climates. The present unit may be used with any type of air flow register used in residential homes today.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. In combination:

a register having a register opening for delivering heated or cooled air into a room;

a housing having a closed top wall, a bottom wall spaced below said top wall, and a side wall interconnecting said top wall and said bottom wall and enclosing a fan chamber therebetween;

said bottom wall having at least one air intake opening therein positioned over said register opening for permitting air flow from said register into said fan chamber;

said side wall having at least one air outlet opening permitting air flow from said fan chamber to the exterior of said housing;

a centrifugal fan rotor rotatably mounted in said fan chamber for rotation about a fan axis extending in a line which intersects said bottom wall and said top wall, said fan rotor having radially extending blades shaped to force air radially outwardly from said fan axis toward said air outlet in response to rotation of said fan rotor about said fan axis;

a motor located completely within said fan chamber and connected to said fan rotor for rotating said fan rotor about said fan axis;

an air filter positioned in covering relation over at least one of said air intake opening or said air outlet opening for filtering dust form air passing from said register through said fan chamber;

a power circuit connected to said motor;

a switch between said power circuit and said motor, said switch being in an open circuit condition in response to a first signal and being responsive to a second signal to change to a closed circuit condition;

a temperature sensing circuit operatively connected to said switch, said temperature sensing circuit including a thermistor positioned to be exposed to air temperature within said fan chamber;

said temperature sensing circuit being capable of sending one of said first and second signals to said switch in response to said thermistor being exposed to an air temperature above a preselected temperature and being capable of sending the other of said first and second signals to said switch when said thermistor is exposed to an air temperature below said preselected temperature;

a fan control support supporting said power circuit, said switch, and said temperature sensing circuit within said fan chamber.

2. The combination according to claim 1 wherein said motor is adapted to rotate said fan at approximately 1200 RPM or less.

3. The combination according to claim 1 wherein said motor is adapted to operate in at least three rotational speeds of approximately 1300 RPM, 1150 RPM and 950 RMP.

4. The combination according to claim 3 wherein said fan rotor is of a size and shape to cause air flows of 400 CFM, 300 CFM and 200 CFM at said three rotational speeds of 1300 RPM, 1150 RPM, and 950 RPM respectively.

5. The combination according to claim 1 wherein said bottom wall includes a downwardly extending flange around the perimeter thereof for supporting said bottom wall in spaced relation above said register and for providing a seal around the perimeter of said register when said bottom wall is placed over said register.

6. The combination according to claim 5 wherein said filter is placed in covering relation over said air inlet opening below said bottom wall, said filter permitting air to pass through said inlet opening while removing foreign particles from said air.

7. The combination according to claim 1 wherein said thermistor has a low mass so as to provide a quick resistance change sufficient to generate a change between said first and second signals in response to a temperature change of 2° F. relative to said preselected temperature.

8. The combination according to claim 1 wherein said temperature sensing circuit includes adjustment means for adjusting said preselected temperature.

9. The combination according to claim 8 wherein said adjustment means comprises a potentiometer.

10. The combination according to claim 1 wherein said temperature sensing circuit includes a heat/cool switch movable from a heat position for causing said temperature sensing circuit to generate said first and second signals respectively when said thermistor is exposed to temperatures below and above said preselected temperature respectively to a cool position for causing said temperature sensing circuit to generate said second and first signals respectively when said thermistor is exposed to temperatures below and above said preselected temperature respectively.

* * * * *